United States Patent
Le Brazidec et al.

(10) Patent No.: US 9,098,483 B2
(45) Date of Patent: Aug. 4, 2015

(54) SYSTEMS AND METHODS TO PROVIDE DYNAMIC LOCAL MEMBERS ASSOCIATED WITH AN ADD-IN FOR A SPREADSHEET APPLICATION

(75) Inventors: Pierre Jean Le Brazidec, Guichen (FR); Florent Migeon, Clichy (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 762 days.

(21) Appl. No.: 12/962,085

(22) Filed: Dec. 7, 2010

(65) Prior Publication Data

US 2012/0144284 A1 Jun. 7, 2012

(51) Int. Cl.
*G06F 17/00* (2006.01)
*G06F 17/24* (2006.01)
*G06F 17/30* (2006.01)

(52) U.S. Cl.
CPC .............. *G06F 17/246* (2013.01); *G06F 17/24* (2013.01); *G06F 17/30592* (2013.01)

(58) Field of Classification Search
CPC .. G06F 17/24; G06F 17/246; G06F 17/30592
USPC .................................................. 715/212–220
See application file for complete search history.

(56) References Cited

U.S. PATENT DOCUMENTS

| | | | |
|---|---|---|---|
| 6,553,364 B1 * | 4/2003 | Wu ........................................ 1/1 |
| 6,766,325 B1 * | 7/2004 | Pasumansky et al. ................. 1/1 |
| 6,931,418 B1 * | 8/2005 | Barnes ........................... 707/776 |
| 7,139,766 B2 * | 11/2006 | Thomson et al. ....................... 1/1 |
| 7,415,481 B2 * | 8/2008 | Becker et al. .......................... 1/1 |
| 7,721,189 B2 * | 5/2010 | Breedvelt-Schouten et al. ............................ 715/213 |
| 7,805,433 B2 * | 9/2010 | Dickerman et al. ........... 707/713 |
| 8,099,383 B2 * | 1/2012 | Naibo et al. ................... 707/603 |
| 8,126,887 B2 * | 2/2012 | Polo-Malouvier et al. ... 707/729 |
| 8,935,606 B2 * | 1/2015 | Knox .............................. 715/245 |
| 2002/0184260 A1 * | 12/2002 | Martin et al. .................. 707/503 |
| 2003/0009649 A1 * | 1/2003 | Martin et al. ...................... 712/1 |
| 2006/0271841 A1 * | 11/2006 | Thanu et al. ................... 715/503 |
| 2006/0294086 A1 * | 12/2006 | Rose et al. .......................... 707/3 |
| 2009/0119309 A1 * | 5/2009 | Gibson et al. ................. 707/100 |
| 2009/0292730 A1 * | 11/2009 | Li et al. ...................... 707/104.1 |

(Continued)

FOREIGN PATENT DOCUMENTS

WO 02/069212 A2 9/2002

OTHER PUBLICATIONS

Javid, Usman, "Excel 2010: Name Range", Feb. 6, 2010, addictivetips, 7 pages http://www.addictivetips.com/microsoft-office/excel-2010-name-range/.*

Microsoft, "Define and use names in formulas", 2007, Microsoft, 8 pages https://support.office.com/en-ca/article/Define-and-use-names-in-formulas-4d0f13ac-53b7-422e-afd2-abd7ff379c64.*

(Continued)

*Primary Examiner* — Cesar Paula
*Assistant Examiner* — David Faber
(74) *Attorney, Agent, or Firm* — Buckley, Maschoff & Talwalkar LLC

(57) ABSTRACT

According to some embodiments, a system, method, means, and/or computer program code are provided to facilitate use of a spreadsheet application to access information stored in a multidimensional data source. Some embodiments include determining, at an add-in module, that a local member is to be attached to an attachment element of a report generated based on the multidimensional data source. The add-in module may receive a refresh indication from the spreadsheet application and dynamically update a reference in a spreadsheet cell based on a change associated with the attachment element.

20 Claims, 13 Drawing Sheets

(56) References Cited

U.S. PATENT DOCUMENTS

| | | |
|---|---|---|
| 2009/0319542 A1 | 12/2009 | Le Brazidec et al. |
| 2010/0083082 A1 | 4/2010 | Lehrian et al. |
| 2010/0169759 A1 | 7/2010 | Le Brazidec et al. |
| 2010/0269092 A1* | 10/2010 | Dorman ................ 717/106 |

OTHER PUBLICATIONS

"Communication: Extended European Search Report", pursuant to Rule 62 EPC, dated Feb. 15, 2012, for European Patent Application No. 11009459.6-1527, 8pgs.

* cited by examiner

|   | A | B | C | D | E | F |
|---|---|---|---|---|---|---|
| 1 |   |   |   |   |   |   |
| 2 |   |   | DEC. 2004 | DEC. 2005 | DEC. 2006 | EXCEL FORM |
| 3 |   | TR100-SALES | 403,000 | 754,000 | 459,000 | -351,000 |
| 4 |   | R11-EXTERNAL SALES | 300,000 | 500,000 | 300,000 | -200,000 |
| 5 |   | R13-INTERNAL SALES | 103,000 | 254,000 | 159,000 | -151,000 |
| 6 |   | TR310- GROSS MARGIN | 256,000 | 514,000 | 167,000 | -258,000 |
| 7 |   | TR300-OPERATING PROFIT | 195,000 | 416,000 | -53,000 |   |
| 8 |   | TR800-NET PROFIT | 238,000 | 824,000 | 327,000 |   |
| 9 |   |   |   |   |   |   |

400

TO BE DELETED ↓ (column D)

FIG. 4

| | A | B | C | D | E |
|---|---|---|---|---|---|
| 1 | | | | | |
| 2 | | | DEC. 2004 | DEC. 2006 | EXCEL FORM |
| 3 | | TR100-SALES | 403,000 | 459,000 | #REF! |
| 4 | | R11-EXTERNAL SALES | 300,000 | 300,000 | #REF! |
| 5 | | R13-INTERNAL SALES | 103,000 | 159,000 | #REF! |
| 6 | | TR310- GROSS MARGIN | 256,000 | 167,000 | #REF! |
| 7 | | TR300-OPERATING PROFIT | 195,000 | -53,000 | |
| 8 | | TR800-NET PROFIT | 238,000 | 327,000 | |
| 9 | | | | | |

|   | A | B | C | D | E | F |
|---|---|---|---|---|---|---|
| 1 |   |   |   |   |   | LOCAL MEMBER |
| 2 |   |   | DEC. 2004 | DEC. 2005 | DEC. 2006 |   |
| 3 |   | TR100-SALES | 403,000 | 754,000 | 459,000 | =E3/2 |
| 4 |   | TR310- GROSS MARGIN | 256,000 | 514,000 | 167,000 |   |
| 5 |   | TR300-OPERATING PROFIT | 195,000 | 416,000 | -53,000 |   |
| 6 |   | TR800-NET PROFIT | 238,000 | 824,000 | 327,000 |   |
| 7 |   |   |   |   |   |   |
| 8 |   |   |   |   |   |   |
| 9 |   |   |   |   |   |   |

| SUM | FX | =E3/2 |
|---|---|---|

SYSTEMS AND METHODS TO PROVIDE DYNAMIC LOCAL MEMBERS ASSOCIATED WITH AN ADD-IN FOR A SPREADSHEET APPLICATION

FIELD

Some embodiments of the present invention relate to business information, business intelligence, and/or enterprise systems. In particular, some embodiments relate to systems and methods to provide dynamic local members associated with an add-in for a spreadsheet application in connection with information from one or more business information, business intelligence, and/or enterprise system databases.

BACKGROUND

A business information, business intelligence, and/or enterprise system can improve an organization's ability to monitor and manage data in a complex business environment. For example, the systems offered by SAP AG of Walldorf, Germany, provide components and tools that allow users to monitor, retrieve, view and manipulate business information, including business warehouse data stored and maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity ("ODBC") and the like.

A user may be interested in retrieving some of the stored business information for a variety of reasons, such as to explore the information or to create a display or report that shows the information. The user may, for example, import a particular set of information into a spreadsheet application by entering names or identifiers into various cells in a spreadsheet to define what information should be associated with those cells, rows, and/or columns. For example, the user may associate a particular row with a measure such as profit and a number of columns with different fiscal years, where the years are associated with a dimension. Measures and dimensions may be defined, for example, in a metadata model associated with the stored business information. To associate a particular cell, row, and/or column with particular types of business information, a user may enter an identifier into a spreadsheet cell. For example, a user might type product names into a number of different cells in order to create a report showing how profitable each product was in a given year.

A user might also arrange for some spreadsheet cells to display information based on other cells in the spreadsheet. For example, a user might indicate that one particular cell should display a value representing the addition of values from two other particular cells (e.g., a cell representing "global sales" might display the result of adding the value of a cell representing "northern hemisphere sales" to the value of a cell representing "southern hemisphere sales"). In some cases, however, it can be difficult to enter and maintain appropriate formulas and results in the spreadsheet. For example, if a formula is defined using a spreadsheet application it may be difficult to update the results of the formula as appropriate when columns and/or rows in a spreadsheet are changed.

It may therefore be desirable to provide improved methods and systems that facilitate an efficient access and display of business information for a user, including situations where a spreadsheet application displays information associated with formulas.

BRIEF DESCRIPTION OF THE DRAWINGS

FIGS. 3-5 illustrate examples of spreadsheet user displays.

FIG. 7 illustrates a spreadsheet user display where a user is entering a spreadsheet formula according to some embodiments.

DETAILED DESCRIPTION

To alleviate problems inherent in the prior art, some embodiments of the present invention introduce systems, methods, computer program code and/or means to create a dynamic local member for an add-in associated with a spreadsheet application in connection with information from one or more business information, business intelligence, and/or enterprise system databases. Some embodiments are described herein as accessing OnLine Analytic Programming ("OLAP") information associated with a multidimensional data schema. Note, however, that embodiments may be associated with other types of information including data described by a metadata model (e.g., which may itself include metadata structures) associated with the data. Such data can include information stored in one or more data sources, such as relational databases.

Figure 1:
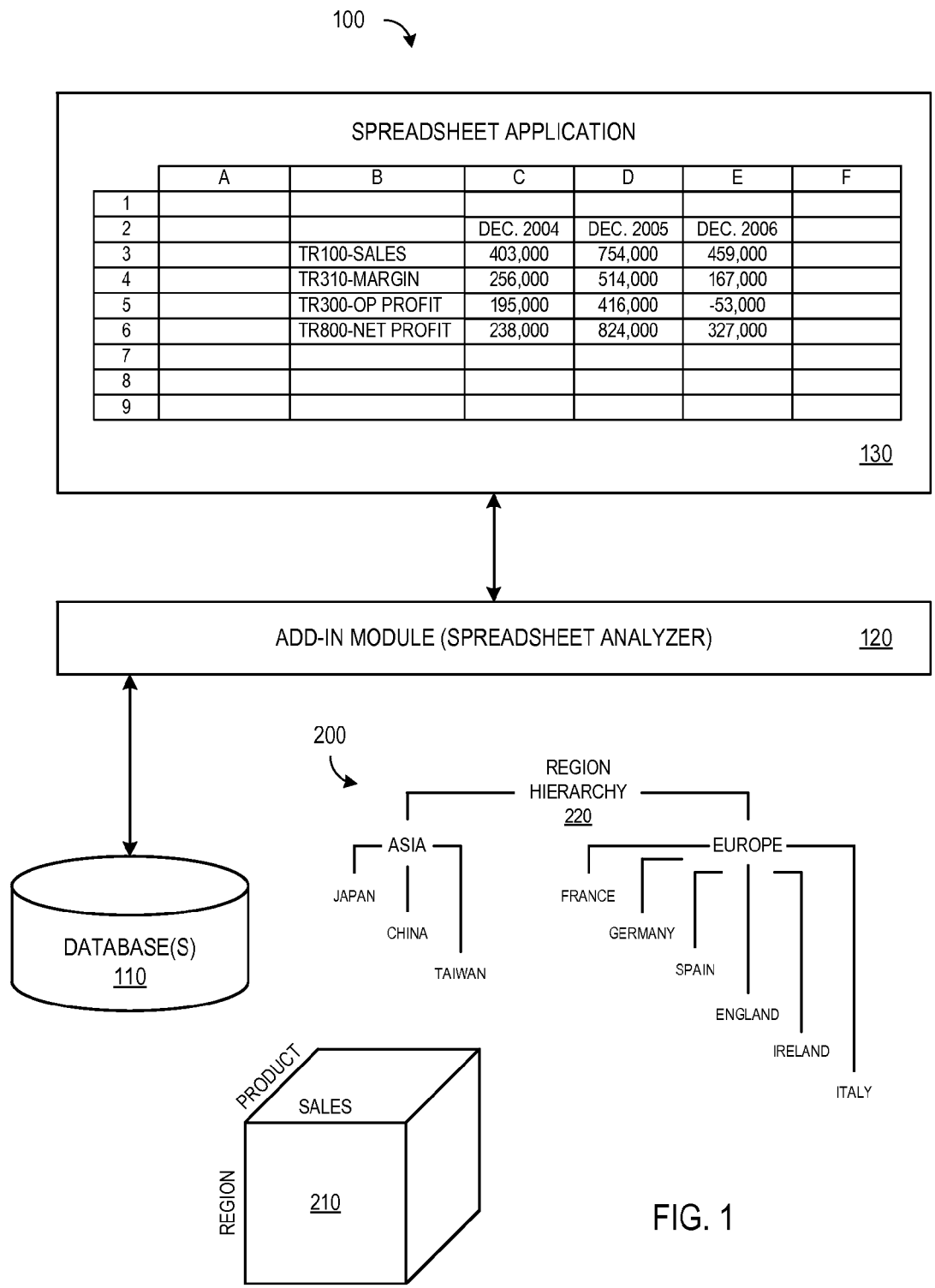
FIG. 1 is a diagram of a system according to some embodiments of the present invention.
Figure 2:
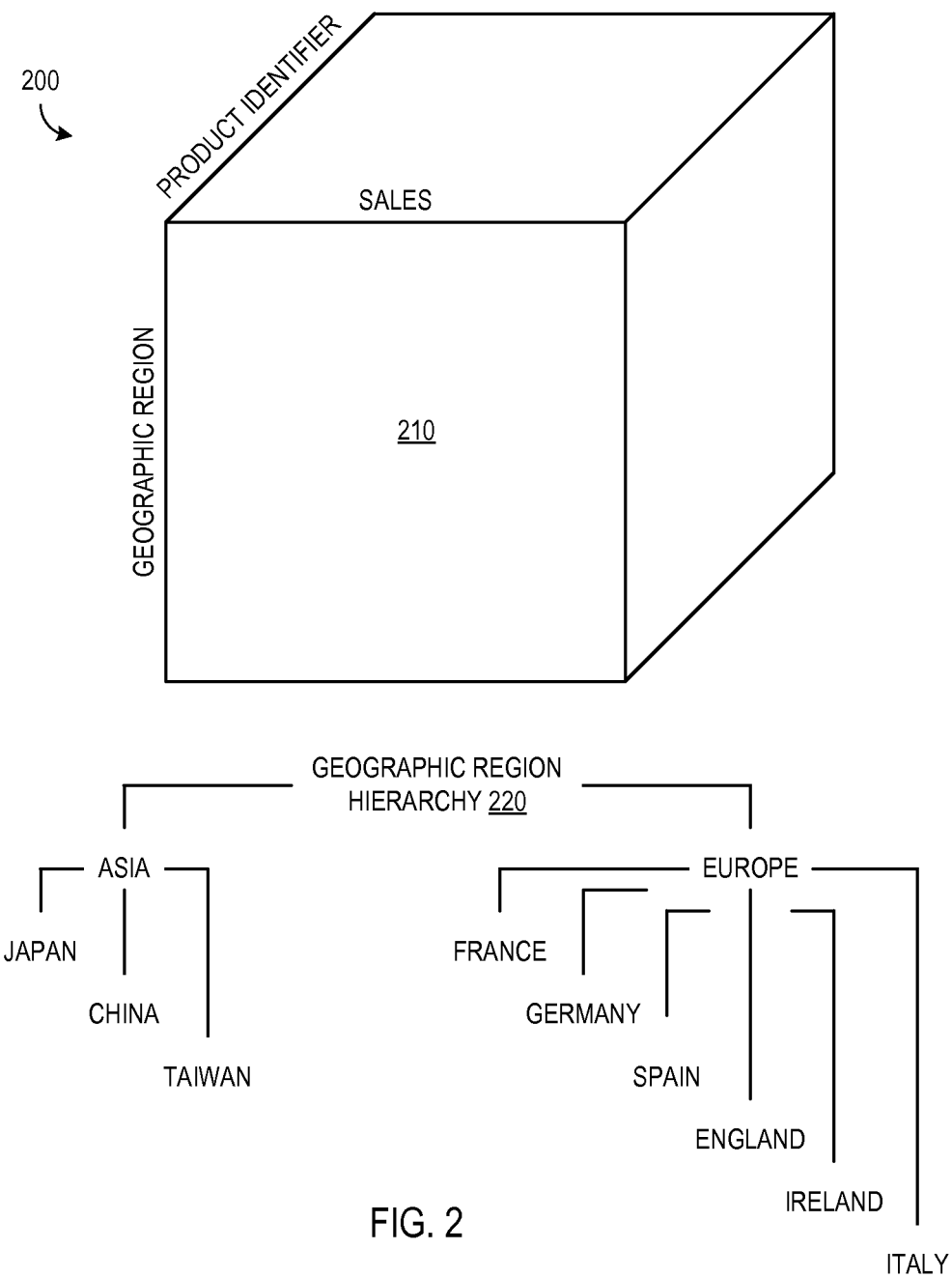
FIG. 2 illustrates how information is stored and/or accessed in accordance with some embodiments of the present invention.

FIG. 1 is a diagram of a system 100 according to some embodiments of the present invention. The system 100 includes one or more databases 110 that may store information, such as business information. For example, FIG. 2 illustrates information 200 that might be stored and/or accessed in accordance with some embodiments of the present invention. In particular, the information 200 includes an OLAP cube 210. An OLAP cube 210 or hypercube may comprise, for example, a data structure storing financial information as numeric facts (or "measures") categorized by dimensions. The OLAP cube 210 may include or be associated with a metadata model that describes aspects of the cube, such as the measures, the dimensions, the relationships or hierarchy of the dimensions, and the like. Although an OLAP cube 210 is illustrated in FIG. 2, note that embodiments may be associated with other types of data sources, such as another type of multidimensional data source, or a data source that includes dimension and measure data. The OLAP cube 210 illustrated in FIG. 2 stores measures associated with sales, product identifier, and geographic region dimensions. Note that the OLAP cube 210 may store information in accordance with any number of dimensions. In some embodiments, the stored information 200 may be accessed using MultiDimensional Expressions ("MDX") which is a declarative query and data manipulation language similar to Structured Query Language ("SQL") but adapted for multidimensional data.

The stored information 200 may include and/or be described by a metadata model. The metadata model may, for example, include relationships between data elements, common and multilingual names for the elements, descriptions of elements, data lineage for data elements, and the like. The stored information 200 may, in some cases, be arranged in a hierarchy structure 220 providing a series of parent-child relationships (e.g., where a parent member represents a consolidation of children members). A hierarchy may have more than one level and may or may not be symmetrical. Symmetry for hierarchies includes balance (where all branches end at the same level), leveling (where all members on a certain level are derived from a single source), and the like.

For example, the hierarchy structure 220 illustrated in FIG. 2 organizes the geographic region dimension in a first level as representing either "Asia" or "Europe." Moreover, the "Europe" region is further organized at a lower level as including the following sibling regions: "France," "Germany," "Spain," "England," "Ireland," and "Italy." According to some embodiments, each region might be further related to other dimensions of information of the OLAP cube 210 (e.g., yearly sales figures and operating profits).

Referring again to FIG. 1, an add-in module 120 may act as an interface between the databases 110 and a spreadsheet application 130. The spreadsheet application 130 might be associated with, for example, the spreadsheet programs Microsoft® Excel®, Apple® Numbers® and IBM® Lotus 1-2-3®, online spread sheet programs and the like. The add-in module 120 might comprise, for example, a spreadsheet add-in such as an Extended Analytics Analyzer Excel Add-In from SAP AG. As used herein, a spreadsheet "add-in" may refer to, for example, a plug-in component or module that executes in association with a spreadsheet application to provide additional functionality for a user. Note that that the add-in module 120 and the spreadsheet application 130 might execute at a first device (e.g., a user PC or workstation) while the databases 110 are stored at a second device, remote from the first device. According to some embodiments, some or all of the information in the databases 110 may be co-located with the device executing the add-in module 120 and spreadsheet application 130. According to still other embodiments, some or all of the spreadsheet application 130 executes via a web based interface.

Figure 3:
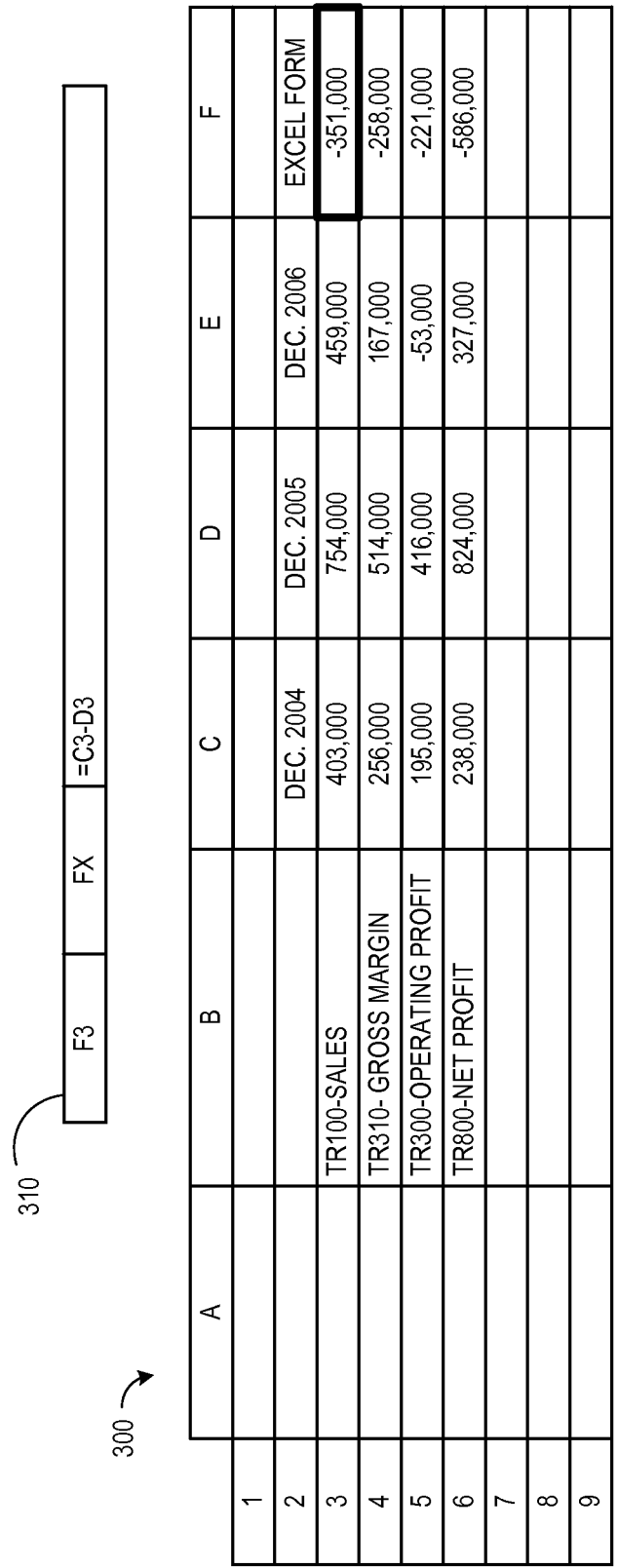

According to some embodiments, a user may define and view a spreadsheet, using the spreadsheet application 130, in order to access the information in the databases 110. For example, FIG. 3 illustrates a spreadsheet user display 300 that includes cell rows (rows 1 through 9) and columns (columns A through F). Note that the display 300 illustrated in FIG. 3 may only represent a small portion of an actual spreadsheet. For example, a spreadsheet might include thousands of rows and/or columns.

A user may select one or more of the spreadsheet cells to represent a currently active cell. For example, a user might position a cursor over a cell and perform an action (e.g., a mouse click) to designate that cell as the currently active cell (such as cell F3 represented as bold in FIG. 3). The active cell may be associated with the formula interface area 310

The spreadsheet user display 300 may help a user access and understand the information stored in, for example, the OLAP cube 210. In FIG. 3, the user has created a spreadsheet such that the cells in rows 3 through 6 of column B define four financial categories (sales, gross margin, operating profit, and net profit) while the cells in columns C through E of row 2 define sales periods (December 2004 through December 2006, respectively). The add-in module 120 may retrieve information from the OLAP cube 210 and insert the proper numerical values in the spreadsheet (e.g., to indicate that net profit for December 2005 was "824,000" as displayed in cell D6 of the spreadsheet 300).

The add-in module 120 may store and/or recognize information in cells using pre-determined types of formulas. According to some embodiments, the add-in module 120 may be associated with a report editor of an Enterprise Performance Management ("EPM") application. For example, the add-in module 120 might store and/or recognize the following type of formula in spreadsheet cells:

=EPM Member(fullName,displayName)

where displayName is a string representing what should be shown on the user's display and fullName defines where the information is actually stored in the OLAP cube 210. The full name may correspond to an element in the metadata model associated with the OLAP cube 210. By way of example only, a particular cell might contain the formula:

=EPM Member("[Region]·[Europe]·[France]", "France")

Note that such a formula might include other parameters, such as a unique identifier associated with the data (e.g., a unique alphanumeric string that might be used to correlate information even when a display name and/or full name has been changed), dimension information, hierarchy information, and/or metadata.

Note that each cell in the spreadsheet user display 300 may contain content, such as a numeric value, text, an image, or a formula. According to some embodiments, the spreadsheet user display 300 may further include graphical representations (e.g., charts) representing the content of the various cells.

By way of example, a user has used the formula interface area 310 to enter an Excel formula of "C3−D3" for the active cell of FIG. 3 (cell F3). That is, the user intends the value of cell F3 to represent the sales from December 2004 subtracted by the sales from December 2005. As a result, the spreadsheet application 130 may automatically compute a value (based on the current content stored in cells C3 and D3) to be displayed in the active cell F3. In the example of FIG. 3, similar operations are performed for each of the cells F3 through F6 (labeled as Excel Formulas or "EXCEL FORM" in this particular example of a spreadsheet).

Note, however, that when a formula associated with an external database 110, such as an OLAP cube 210, is defined using a spreadsheet application (e.g., via the formula interface area 310) it may be difficult to update the results of the formula as appropriate when columns and/or rows in a spreadsheet are changed. Consider what might happen, for example, if two new rows were added to the spreadsheet user display 300 illustrated in FIG. 3 between existing rows 3 and 4. FIG. 4 illustrates such a display 400 where two new rows—representing OLAP children of row 3—have been added (and prior rows 4 through 6 have been moved down to now occupy rows 6 through 8). In this case, the spreadsheet application may fail to update values of F7 and F8 as appropriate (as indicated by the empty cells in FIG. 4).

Similarly, consider what might happen if column D was to be completely deleted from the display 400 of FIG. 4. FIG. 5 illustrates such a display 500 (and prior columns E and F have been moved left to now occupy columns D and E). In this case, the spreadsheet application might be completely unable to update the values in cells E3 through E6 at all (as indicated by the "#REF!" error message in FIG. 5). Note that one of the needed values for the result to be computed as originally intended by the user is no longer even present in the spreadsheet (namely, sales from December 2005)—although that value is presumably still present in the external database 110 and/or OLAP cube 210.

Similar problems may arise when a user moves cells around on a spreadsheet, expands or contracts a hierarchy of a spreadsheet, and/or changes an axis associated with a spreadsheet (e.g., by swapping rows and columns).

To avoid such problems, a dedicated formula definition editor may be provided to let a user define a formula that directly accesses the external database 110 and/or OLAP cube 210 using, for example, an MDX language. Such a formula definition editor, however, may be unfamiliar to many users (such as business users) and the specific syntax associated with the editor may be confusing and lead to errors.

Note that the add-in module 120 may comprise a registered automation add-in of the spreadsheet application 130 that receives notifications from the spreadsheet application 130 in the form of "events." For example, the spreadsheet application 130 might issue an event to the add-in module 120 whenever the active cell is changed by the user. The spreadsheet application might also issue an event to the add-in module 120 when the spreadsheet display is refreshed (e.g., when the user has navigated or otherwise changed the display in some way).

Figure 6:
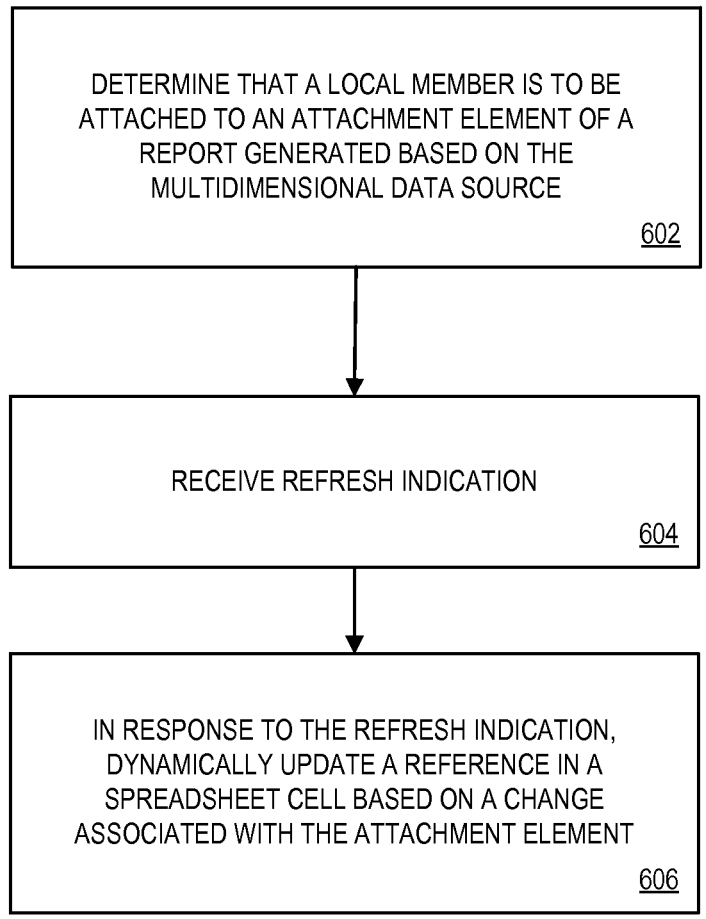
FIG. 6 is a flow diagram of a method according to some embodiments of the present invention.

According to some embodiments, events from the spreadsheet application 130 generated "on the fly" (e.g., as the user enters information and before a report is validated) may be advantageously used by the add-in module 120 to facilitate an access of business information stored in the databases 110. For example, FIG. 6 is a flow diagram depicting process steps for operating an add-in module and spreadsheet application that may be performed by the business information enterprise system 100 of FIG. 1. The flow charts described herein do not necessarily imply a fixed order to the actions, and embodiments may be performed in any order that is practicable. Note that any of the methods described herein may be performed by hardware, software (including low level language code), firmware, or any combination of these approaches. For example, a storage medium may store thereon instructions that when executed by a machine result in performance according to any of the embodiments described herein.

At 602, it may be determined that a local member is to be attached to an attachment element of a report generated based on the multidimensional data source. According to some embodiments, the determination of 602 and/or the other actions described with respect to FIG. 6 may be associated with a report editor of an EPM application.

For example, an indication might be received that a user has entered a spreadsheet formula for the at least one spreadsheet cell. In this case, the user-entered formula might be automatically translated into the local member formula (and the local member might be automatically be created). For example, a spreadsheet formula may be translated into a local member multidimensional formula (e.g., using a language and/or syntax associated with the multidimensional data source). In some cases, an add-in module might compare the formula a list of equivalent expression associated with a multidimensional data source. Note that the translation may be "dynamic," for example, because it is performed as a user enters information (instead of when an entire report is validated). According to some embodiments, this automatic translation and creation may be disabled by the user. Moreover, according to some embodiments a user may manually create and/or define a local member for a report.

At 604, a refresh indication may be received. For example, a refresh indication may be received at an add-in module from the spreadsheet application when a user navigates within or otherwise alters a display. At 606, in response to the refresh indication, a reference in a spreadsheet cell may be dynamically updated based on a change associated with the attachment element. This dynamic updating might include, for example, transforming the reference to point to a spreadsheet cell associated with appropriate information in the multidimensional data source. Note that local members might not get data directly from a data source. Instead, local members may transform existing spreadsheet formulas such that they still point to an appropriate row and column according to original OLAP members they were associated with. According to some embodiments, local members are tightly linked to the meta-data of the OLAP sources (to help determine which spreadsheet references should be abstracts), but are not directly linked to the data of the data source. Instead, the data that is displayed as values of local members may be calculated by a spreadsheet formula. That is, when the system abstracts a spreadsheet formula it may still be maintained as a spreadsheet formula with cell references being replaced (abstracted) to point to correct members of a data source. When the spreadsheet report is refreshed, the abstractions may be converted back into pure spreadsheet cell references.

According to some embodiments, the attachment element may comprise a specific member of the report. For example, consider FIG. 7 which illustrates a spreadsheet user display 700 that includes cell rows (rows 1 through 9) and columns (columns A through F) where a user has selected spreadsheet cell F3 to represent the currently active cell. Note that the user has created a spreadsheet such that the cells in rows 3 through 6 of column B define four financial categories (sales, gross margin, operating profit, and net profit) while the cells in columns C through E of row 2 define sales periods (December 2004 through December 2006, respectively). The add-in module 120 may retrieve information from the OLAP cube 210 and insert the proper references in the spreadsheet (e.g., such that net profit for December 2005 will be "824,000" as displayed in cell D6 of the spreadsheet 300).

Moreover, a user has utilized a formula interface area 710 to enter an Excel formula of "E3/2" for the active cell (cell F3). That is, the user intends the value of cell F3 to represent fifty percent of the sales from December 2006. As a result, the spreadsheet application 130 may automatically compute a value (based on the current content stored in cell E3) to be displayed in the active cell F3.

When the user enters this formula, the spreadsheet application may transmit a change event signal to the add-in module. As a result, the system may automatically create a local member with an appropriate expression based at least in part on the user-entered spreadsheet formula. The dimension members used in the expression may be retrieved, for example, based on the cells involved in the Excel formula references (or references associated with any other spreadsheet application). In the example of FIG. 7, note that cell E3 is referenced in the Excel formula. When reading the formula, the add-in module may retrieve the columns of the report and/or spreadsheet involved (e.g., December 2006) and thus be able to retrieve the corresponding column headers members that will be used in the expression. The references may, according to some embodiments, be of any kind (e.g., absolute or relative) since they are evaluated once (e.g., when the Excel formula is converted).

Figure 8:
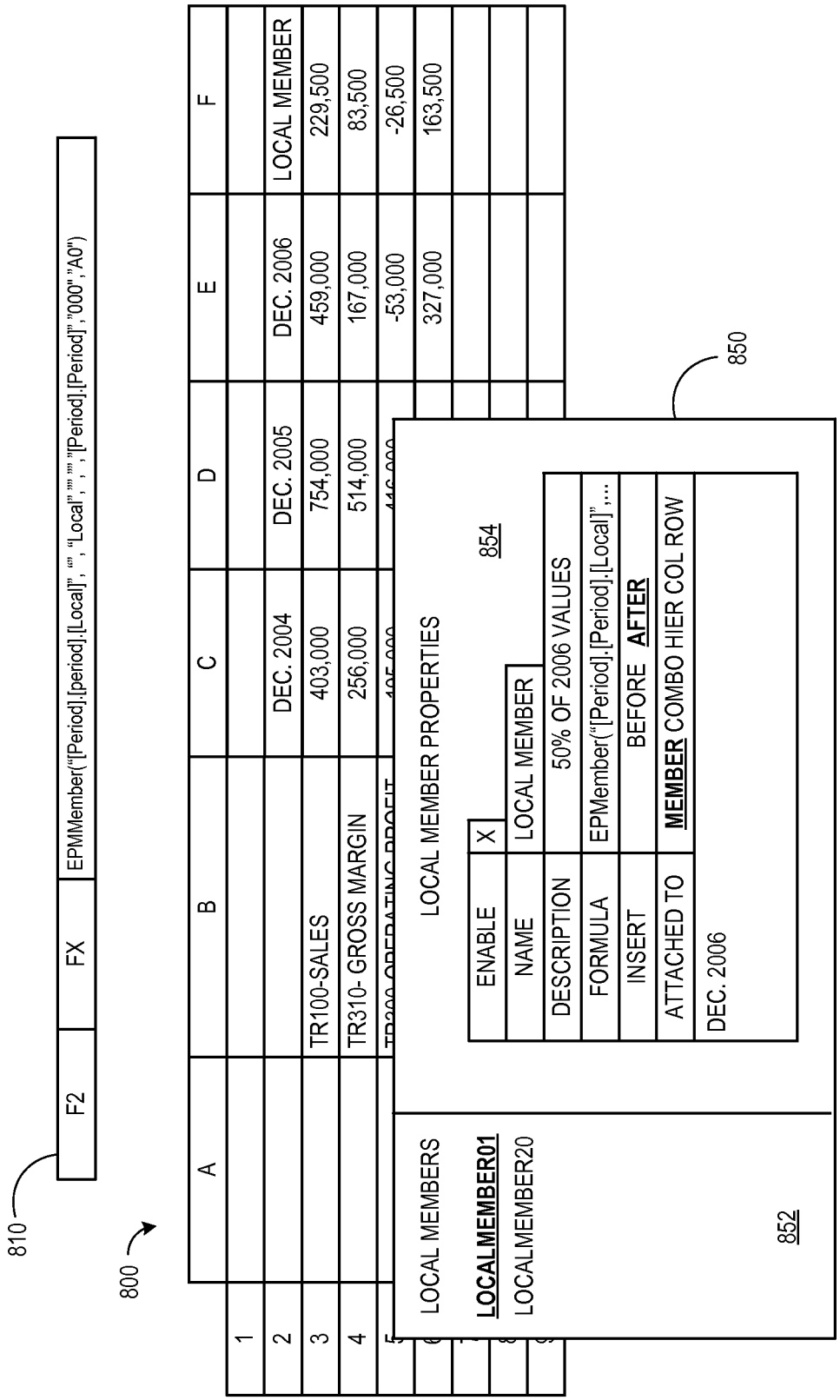
FIG. 8 illustrates a spreadsheet user display where the user-entered formula has been replaced with an automatically created local member according to some embodiments.

In the example of FIG. 8, the local member may be attached to the December 2006 member. In particular, the local member may always be inserted after the appearance of December 2006. Thus, if the user moves column E or otherwise alters the display 700, the local member may be moved accordingly. Moreover, if December 2006 is added elsewhere in the report, the local member may be automatically added. The local member may also be "dynamic" in that it follows expand and/or collapse actions According to some embodiments, if the user had previously entered a name in a corresponding header part of the spreadsheet, the system may use that string it to name the custom member. For example, if the user had entered "Local Member" into cell F2 before entering the spreadsheet formula as illustrated in FIG. 7, the local member might be assigned that name. If no name was previously entered by the user, a name might be automatically generated by the add-in module based on the OLAP members involved in the formula. The automatic name may be generated, for example, by adding text (e.g., "(fn")") and/or concatenating all the dimension member captions involved in the formula. If such a name already exists, a number could be added at the end of the generated string to make it unique.

Once the formula is converted, the local member can be inserted into the appropriate row/column and the report/spreadsheet may be refreshed (e.g., so that the expression may be evaluated for each row in the case of a "column" formula or for each column in the case of a "row" formula). FIG. 8 illustrates a display 800 after the conversion and insertion. Note that area 810 reflects the newly generated EPM-Member information that has been generated.

FIG. 8 further illustrates a local member editor display 850 that may be, for example, accessed by a user of a report editor to create and/or modify local members. The local member editor display 850 includes a selection area 852 where a user may identify which local member is being created or modified (e.g., a local member identified as "localmember01" may be selected by the user as indicated by underline in FIG. 8).

The local member editor display 850 further includes a local member properties area 854. The local member properties area 854 may include, for example, an "enable" option (e.g., the user may enable or disable a local member) along with a name ("Local Member") and a description ("Values 2005-2006") to be associated with the local member. The local member properties area 854 may further indicate the formula associated with the local member and whether the local member should be inserted "before" an attachment element or "after" the attachment element (e.g., "after" has been selected by the user as indicated by underline in FIG. 8). The local member properties area 854 may further indicate the type of attachment element that is associated with the local member: another member (e.g., which has been selected by the user as indicated by underline in FIG. 8); a member combination ("combo"); a hierarchy ("hier"); a column axis ("col"); or a row axis ("row"). Finally, the local member properties area 854 may identify a specific attachment element (member "December 2006" in FIG. 8).

Figure 9:
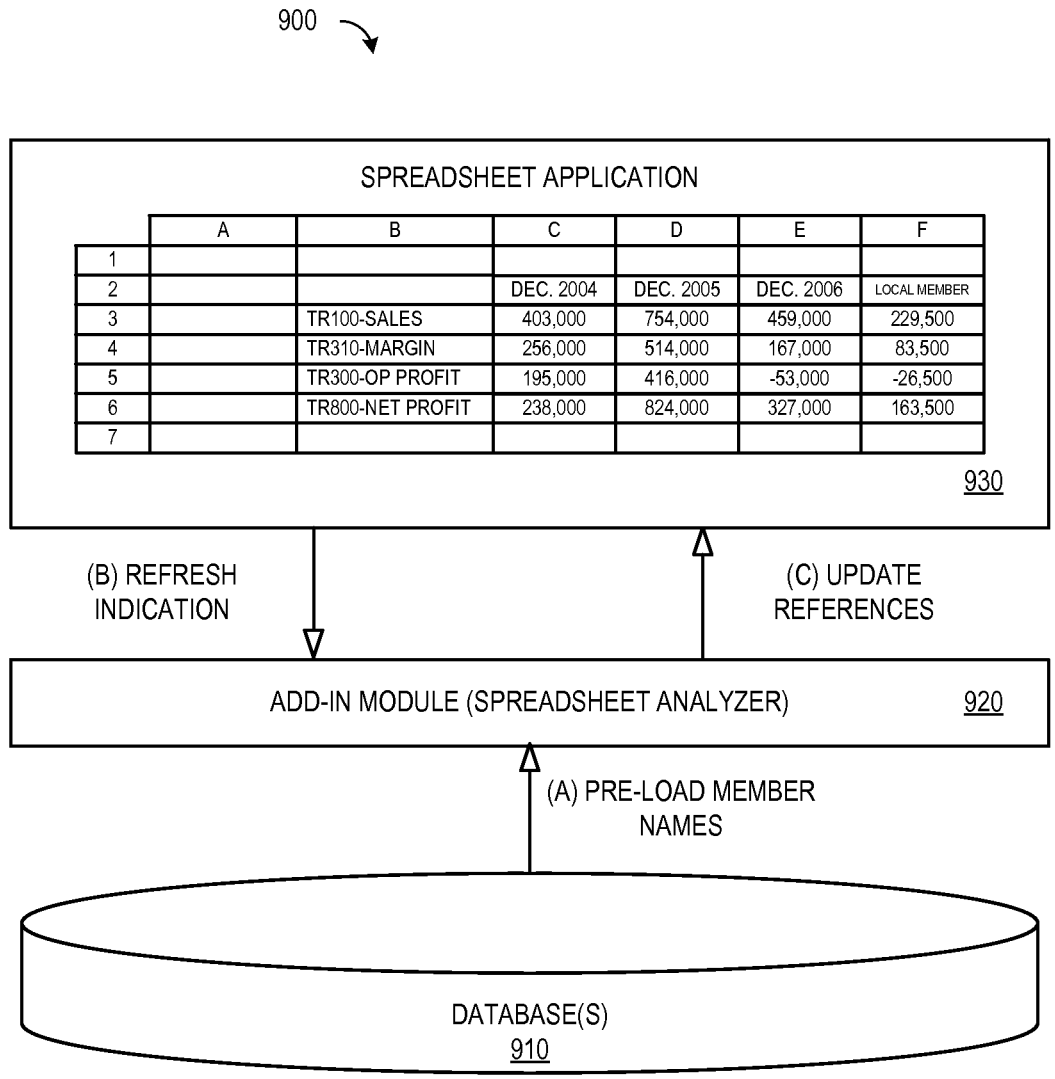
FIG. 9 is an information flow diagram according to some embodiments of the present invention.

FIG. 9 is an information flow diagram 900 according to some embodiments of the present invention. The diagram 900 may be associated with, for example, steps that facilitate a display of information stored in one or more external databases 910 (e.g., one or more multidimensional data sources). The external databases 910 may, for example, store information about members such that at least some members are siblings of other members. According to some embodiments, the external databases 910 further store a metadata structure defining a hierarchy for the members. As used herein the "external" databases 910 may include one or more databases remote from a device executing a spreadsheet application 930 and an add-in module 920 (e.g., an add-in or plug-in component of the spreadsheet application 930).

At action (A), the add-in module 920 pre-loads information associated with a plurality of members of the databases 910. For example, the add-in module 920 might pre-load a list of dimension and/or member name strings from the databases 910. According to some embodiments, the pre-loading is performed by issuing a query to the external databases 910 asking for information dimension and/or member names. This information may, for example, include member names to help the add-in module 920 evaluate and/or convert data associated formulas entered by a user.

At action (B), the add-in module 920 receives a refresh indication from the spreadsheet application 930. In particular, the refresh indication indicates that spreadsheet application 930 display is to be updated. The add-in module 920 then updates any references as appropriate at (C). Consider again the example of FIG. 8 where calculated members were automatically created for cells F4 through F6. That is, fifty percent of the value representing sales for December 2006 is displayed in cell F3, fifty percent of the value representing gross margin for December 2006 is displayed in cell F4, etc. Now, consider what might happen if column E was moved to a completely new location. Because the local member is attached to "December 2006," the add-in module 920 may ensure that the local member moves along with it.

Some embodiments of the present invention may "persist" information associated with a local multidimensional formula in a spreadsheet cell even when a cell associated with an original formula's source member is deleted or moved. That is, the calculated member is not linked to particular spreadsheet cells but instead persist in the data source. According to some embodiments, the local member may be stored "behind the scenes" in the spreadsheet application itself (e.g., and not in the data source). Moreover, local members (e.g., those created on the fly or using an editor) may be stored in the spreadsheet associated with a data source name.

Figure 10:
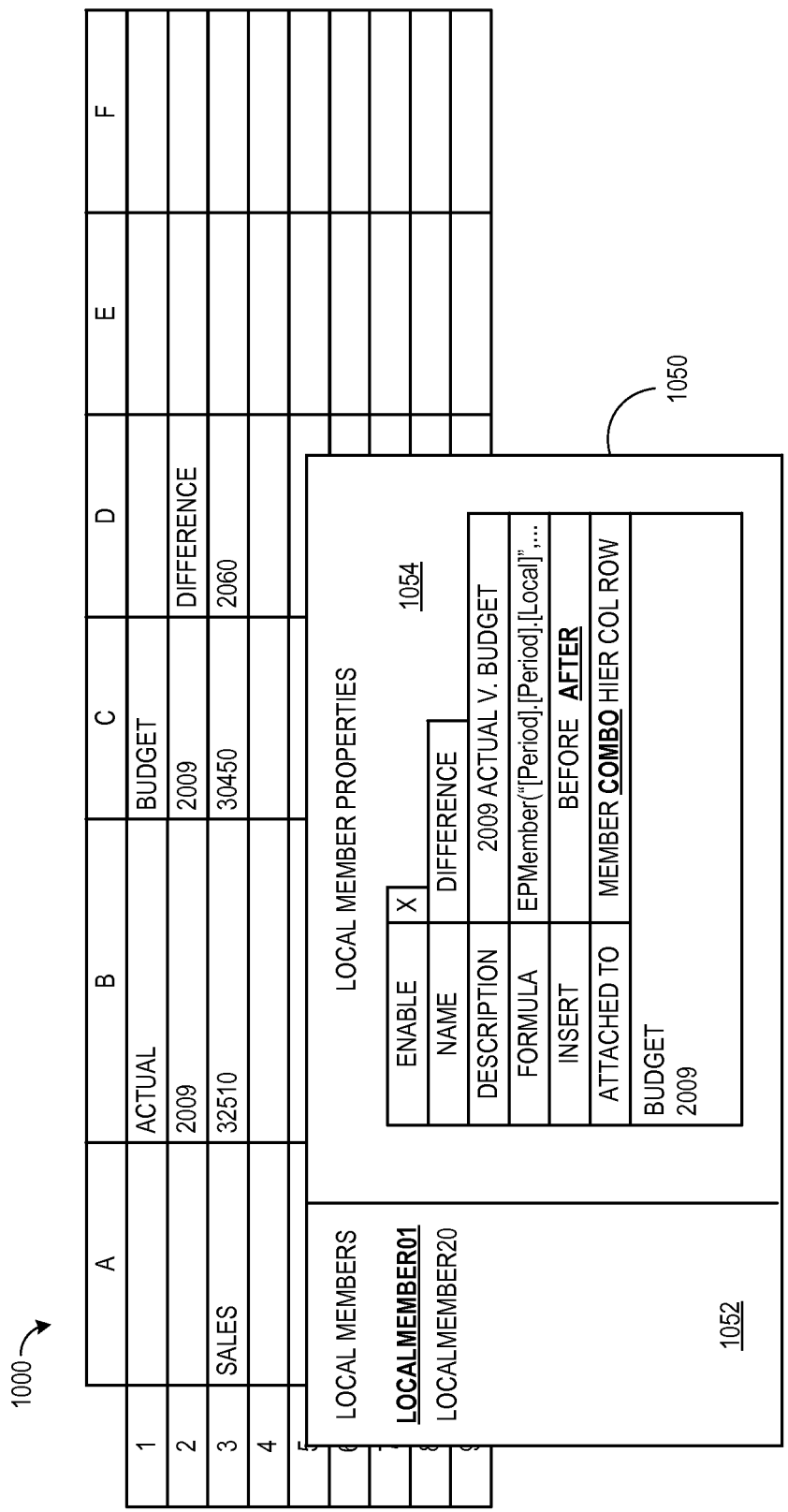
FIG. 10 illustrates a local member attached to a member combination according to some embodiments.

According to other embodiments, the attachment element may be a "combination" of members of the report. For example, FIG. 10 illustrates a display 1000 wherein a local member is attached to a member combination according to some embodiments. In particular, a user may enter "B3−C3" as a formula in cell D3 associated with a local member named "Difference." The formula may be automatically detected and attached to an appropriate member combination. That is, the axis to which the formula applies contains more than one dimension and the entered formula references two different members in the outer dimension. Note that in the example of FIG. 10, there are two dimensions in the column axes. Thus, a local member editor display 1050 includes a selection area 1052 and a local member properties area 1054 that indicates that the local member is attached to a "combination" of "Budget" and "2009." As a result, if that combination of members somewhere elsewhere in the report, the "Difference" local member will also be displayed.

Figure 11:
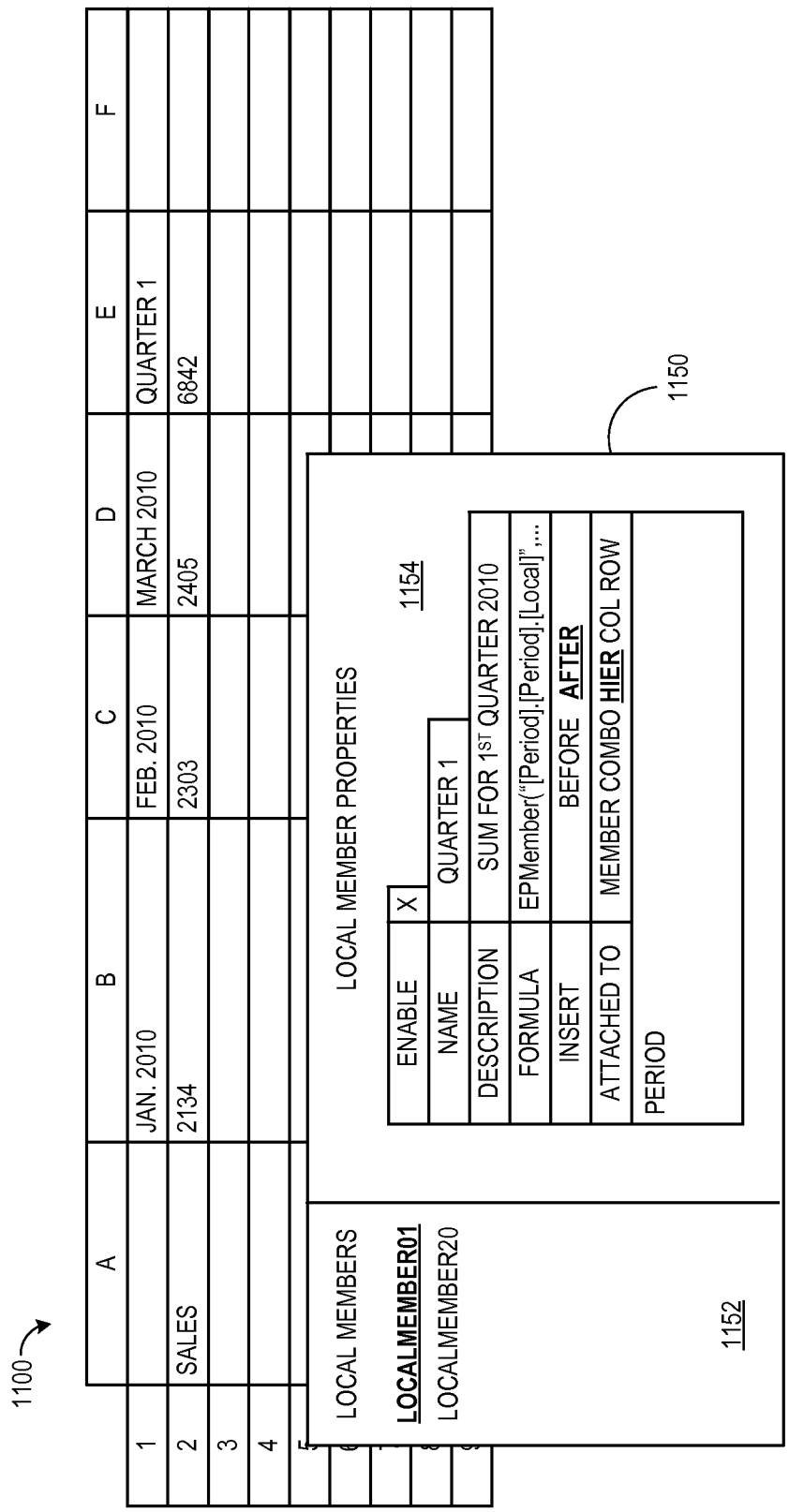
FIG. 11 illustrates a local member attached to a hierarchy according to some embodiments.

According to still other embodiments, the attachment element may be associated with a hierarchy of the report. For example, FIG. 11 illustrates a display 1100 wherein a local member is attached to a hierarchy according to some embodiments. In this example, a user entered "B2+C2+D2" as a formula in cell E2 associated with a local member named "Quarter 1." Moreover, those three values are associated with "January 2010," "February 2010," and "March 2010" of a period hierarchy or dimension. Thus, the user entered formula may be automatically recognized as being a formula that refers all the members displayed in the report for a specific hierarchy/dimension. As a result, a local member editor display 1150 includes a selection area 1152 and a local member properties area 1154 that indicates that the local member is attached to the "Period" hierarchy.

Figure 12:
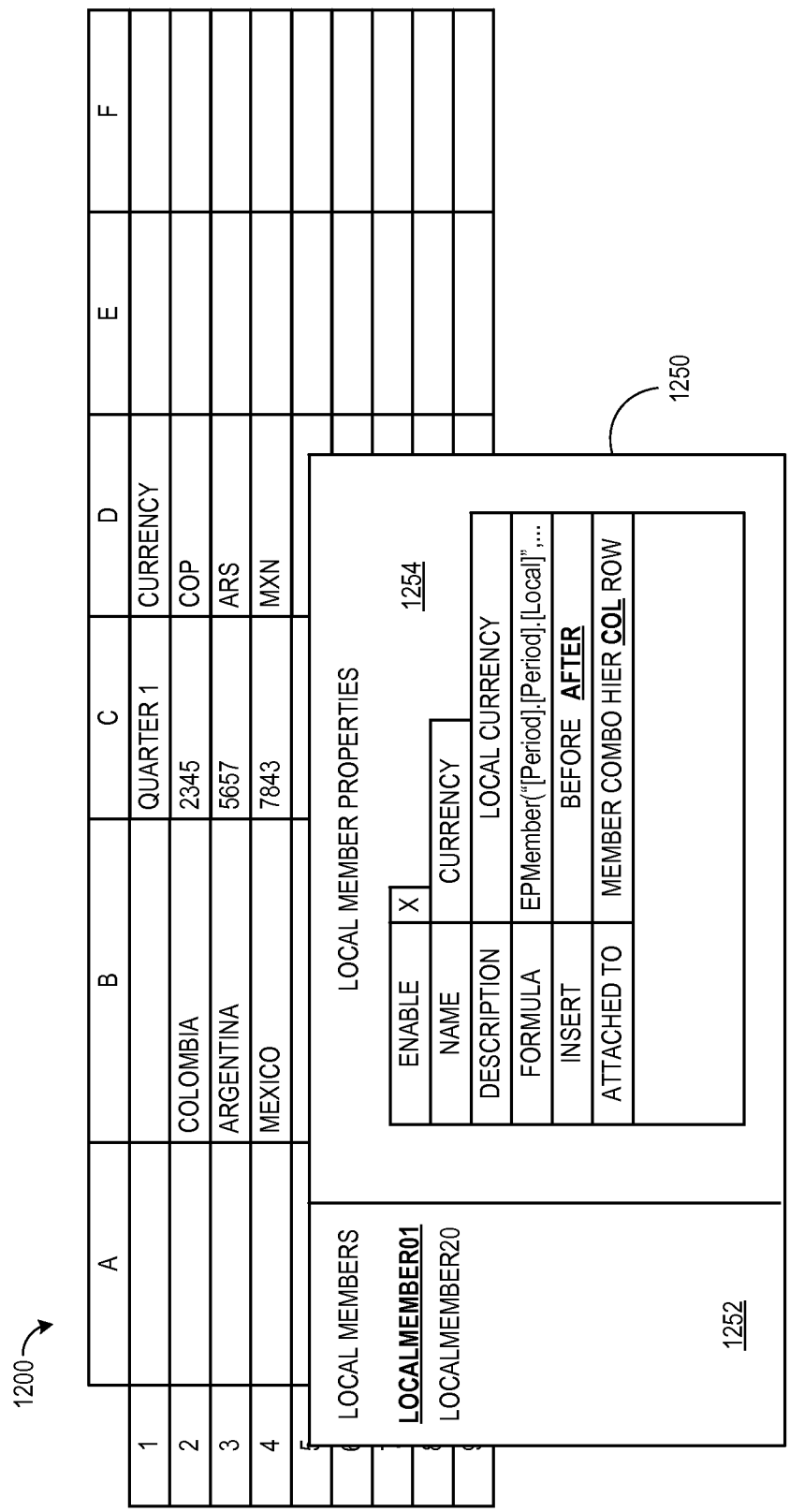
FIG. 12 illustrates a local member attached to a column axis according to some embodiments.

In accordance with some embodiments, the attachment element comprises an axis (column axis or row axis) of the report. For example, FIG. 12 illustrates a display 1200 wherein a local member is attached to a column axis according to some embodiments. In this example, a user has entered a formula that gives information about the members in the opposite axis. In particular, he or she wanted to display currencies for the entities displayed in the row axis and in cell D2 entered a formula that includes an EPMMemberProperty formula that returns the currency properties for the members. The formula was automatically converted into a local member and a local member editor display 1150 includes a selection area 1152 and a local member properties area 1154 that indicates that the local member is attached to the column axis.

Figure 13:
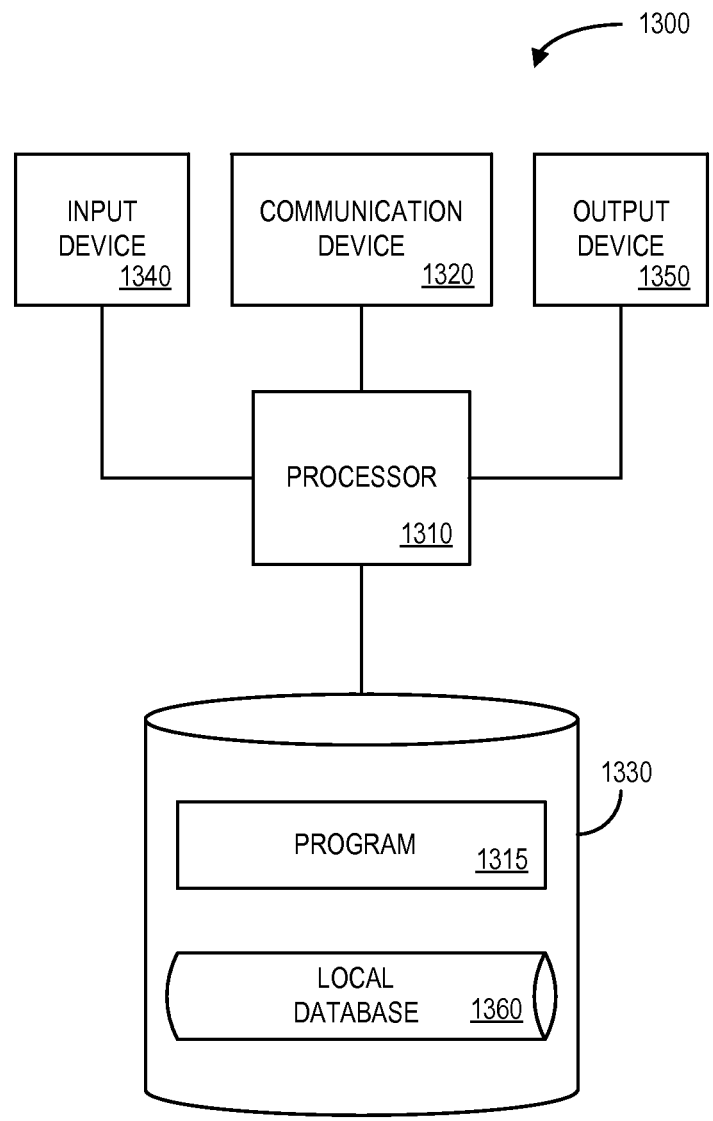
FIG. 13 is a block diagram of an apparatus in accordance with some embodiments of the present invention.

FIG. 13 is a block diagram of an apparatus 1300 in accordance with some embodiments of the present invention. The apparatus 1300 might, for example, execute a spreadsheet application and a spreadsheet plug-in or module similar to add-in module 130 illustrated in FIG. 1. The apparatus 1300 comprises a processor 1310, such as one or more processors, coupled to a communication device 1320 configured to communicate via a communication network (not shown in FIG. 13). The communication device 1320 may be used to exchange OLAP or other business information, for example, with one or more multidimensional data sources (e.g., associated with remote databases or other devices).

The processor 1310 is also in communication with an input device 1340. The input device 1340 may comprise, for example, a keyboard, a mouse, or computer media reader. Such an input device 1340 may be used, for example, to select an active cell and/or to enter spreadsheet formulas associated with the active cell (or group of cells). The processor 1310 is also in communication with an output device 1350. The output device 1350 may comprise, for example, a display screen or printer. Such an output device 1350 may be used, for example, to provide reports and/or display business information to the user.

The processor 1310 is also in communication with a storage device 1330. The storage device 1330 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1330 stores a program 1315 for controlling the processor 1310. The processor 1310 performs instructions of the program 1315, and thereby operates in accordance any embodiments of the present invention described herein. For example, the processor 1310 may determine that a local member is to be attached to an attachment element of a report generated based on the multidimensional data source. The processor 1310 may then receive a refresh indication from the spreadsheet application and dynamically update a reference in a spreadsheet cell based on a change associated with the attachment element.

As used herein, information may be "received" by or "transmitted" to, for example: (i) the apparatus 1300 from other devices; or (ii) a software application or module within the apparatus 1300 from another software application, module, or any other source. As shown in FIG. 13, the storage device 1330 may also store a local information database 1360 according to some embodiments. The local information database 1360 may, for example, store information about some or all of the metadata associated with a multidimensional data source, OLAP cube, data warehouse, or any other data source.

The illustration and accompanying descriptions of devices and databases presented herein are exemplary, and any number of other arrangements could be employed besides those suggested by the figures. For example, multiple databases associated with different types of business information might be associated with the apparatus 1300. Similarly, the local information database 1360 may store different types of additional information that may be helpful when matching user entered name strings with database members, such as spelling variations (including misspellings and country-specific spelling variations), aliases (e.g., nicknames), and/or language variations (e.g., translated names).

As a result of embodiments described herein, a user may be able to create spreadsheet displays of business information more quickly as compared to prior approaches. Moreover, embodiments may help reduce errors associated with the definition of such reports and displays (e.g., because the user does not need to remember and enter a specific syntax). Moreover, the local members are "dynamic" in the report (following expand/collapse actions) can be attached to a dimension (for BPC data sources) or to a hierarchy (for ODBO data sources) or to a specific dimension member or a tuple (a combination of dimension members) or to a dimension axis of the report (row or column).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the applications and databases described herein may be combined or stored in separate systems). Similarly, although a particular information flow and user interactions have been given as examples, other and/or additional steps may be performed in accordance with any embodiments described herein.

Applicants have discovered that embodiments described herein may be particularly useful in connection with an access of information from a multidimensional data source via a spreadsheet application. Note, however, that other types of applications and databases, including transactional and relational databases, may also benefit from the invention. Similarly, although some embodiments have been described in connection with the specific languages, other translations of spreadsheet formulas may be performed in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory machine-readable storage medium having stored thereon processor-executable instructions, to facilitate use of a spreadsheet application to access information stored in a multidimensional data source, that when executed by a processor perform a method, the method comprising:
determining, at an add-in module, that a local member is to be attached to an attachment element of a report generated based on the multidimensional data source, the local member comprising a name property, a formula, an insert property, and an attached to property, wherein the insert property indicates if the local member is inserted before the attachment element or inserted after the attachment element and the attached to property indicates a combination of members of the report;
receiving, at the add-in module, a refresh from the spreadsheet application; and
in response to the refresh indication, dynamically updating, by the add-in module, a reference in a spreadsheet cell based on a change associated with the attachment element wherein the attachment element comprises the combination of members of the report and wherein dynamically updating comprises displaying the local member when the combination of members of the report appears in the spreadsheet application.

2. The medium of claim 1, wherein execution of the instructions further results in:
receiving, at the add-in module, an indication that a user has entered a spreadsheet formula for the at least one spreadsheet cell; and
automatically translating the spreadsheet formula into the local member formula and creating the local member.

3. The medium of claim 2, wherein the automatic translation and creation may be disabled by the user.

4. The medium of claim 1, wherein said dynamic updating comprises transforming the reference to point to a spreadsheet cell associated with appropriate information in the multidimensional data source.

5. The medium of claim 1, wherein the attachment element comprises a specific member of the report.

6. The medium of claim 1, wherein the attachment element comprises a hierarchy of the report.

7. The medium of claim 1, wherein the attachment element comprises an axis of the report.

8. The medium of claim 1, wherein the local member is further associated with at least one of: (i) a user defined name, or (ii) a name automatically generated by the add-in module.

9. The medium of claim 1, wherein the local member is further associated with a description.

10. The medium of claim 1, wherein the local member is further associated with: (i) an indication that the local member should be inserted before the attachment element, or (ii) an indication that the local member should be inserted after the attachment element.

11. The medium of claim 1, wherein the add-in module comprises a registered automation add-in of the spreadsheet application.

12. An apparatus, comprising:
a hardware processor;
a database storing information about a plurality of members via the hardware processor; and
a spreadsheet add-in component adapted to:
determine, via the hardware processor, that a local member is to be attached to an attachment element of a report generated based on the database, the local member comprising a name property, a formula, an insert property, and an attached to property, wherein the insert property indicates if the local member is inserted before the attachment element or inserted after the attachment element and the attached to property indicates a combination of members of the report;
receive a refresh indication from a spreadsheet application; and
in response to the refresh indication, dynamically update a reference in a spreadsheet cell based on a change associated with the attachment element wherein the attachment element comprises the combination of members of the report and wherein dynamically updating comprises displaying the local member when the combination of members of the report appears in the spreadsheet application.

13. The apparatus of claim 12, wherein the database is associated with a multidimensional data source.

14. A method to facilitate a display to a user of information stored in an external database, comprising:
determining, at an add-in, that a local member is to be attached to an attachment element of a report generated based on the external database, the local member comprising a name property, a formula, an insert property, and an attached to property, wherein the insert property indicates if the local member is inserted before the attachment element or inserted after the attachment element and the attached to property indicates a combination of members of the report;
receiving, at the add-in, a refresh indication from the spreadsheet application; and
in response to the refresh indication, dynamically updating, by the add-in, a reference to a spreadsheet cell based on a change associated with the attachment element wherein the attachment element comprises the combination of members of the report and wherein dynamically updating comprises displaying the local member when the combination of members of the report appears in the spreadsheet application.

15. The method of claim 14, wherein the external database further stores a metadata structure and said determining is performed in accordance with the metadata structure.

16. The method of claim 14, wherein the external database comprises a database remote from a device executing the spreadsheet application and the add-in.

17. The method of claim 16, wherein said determining is performed based at least in part on information stored locally to the add-in.

18. The method of claim 17, wherein the locally stored information includes member names associated with the external database.

19. The medium of claim 1, wherein the receiving a refresh indication is associated with the movement of a spreadsheet cell within a spreadsheet.

20. The medium of claim 1, further comprising:
displaying the local member if a combination of members exists elsewhere in the report.

* * * * *